F. A. MYERS.
BUTT HINGE.
APPLICATION FILED DEC. 12, 1919.

1,409,461.

Patented Mar. 14, 1922.

Inventor
Frank A. Myers.

By
his Attorney

UNITED STATES PATENT OFFICE.

FRANK A. MYERS, OF PLAINVILLE, CONNECTICUT, ASSIGNOR TO THE STANLEY WORKS, OF NEW BRITAIN, CONNECTICUT, A CORPORATION OF CONNECTICUT.

BUTT HINGE.

1,409,461.  Specification of Letters Patent.  Patented Mar. 14, 1922.

Application filed December 12, 1919. Serial No. 344,276.

*To all whom it may concern:*

Be it known that I, FRANK A. MYERS, a citizen of the United States, and a resident of Plainville, county of Hartford, State of Connecticut, have invented certain new and useful Improvements in a Butt Hinge, of which the following is a specification.

The object of the present invention is to provide simple and practical means for attaching ball bearings to a butt hinge.

The invention is illustrated in the accompanying drawing wherein.

Figure 1:
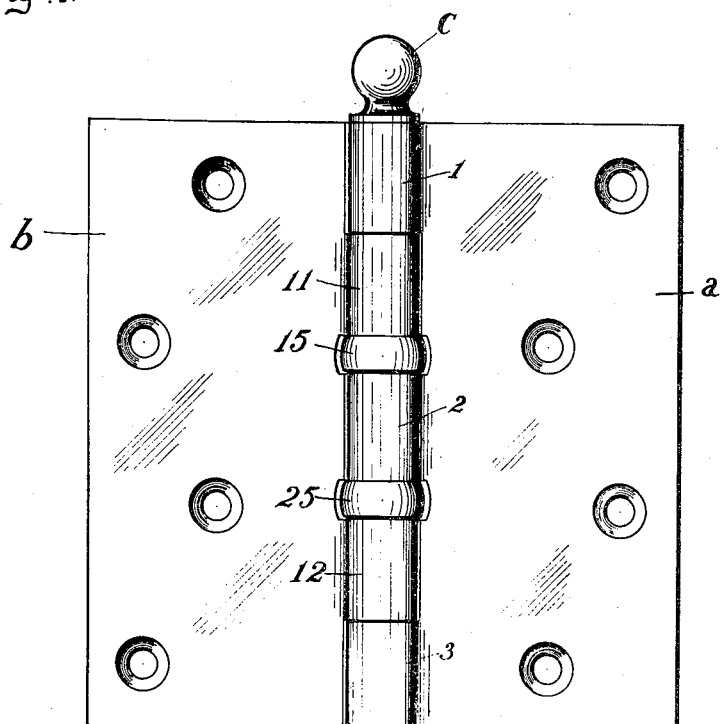
Fig. 1 is a front view of a butt embodying my invention.

In the drawing, *a* denotes one leaf having knuckles 1, 2 and 3, and *b* the other leaf with knuckles 11 and 12, the knuckles, as is usual, being centrally apertured to receive a pintle *c*.

Figure 2:
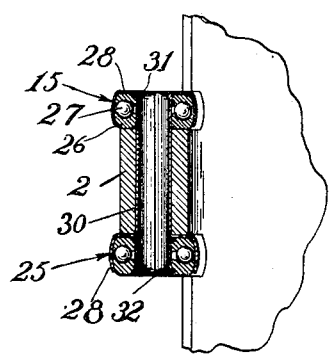
Fig. 2 is a sectional view of the ball bearing attachment.
Figure 3:
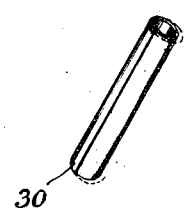
Fig. 3 is a perspective view of the tube for securing the bearings in place.

In Figs. 1 to 3 inclusive, 15 and 25 are ball bearing units positioned at opposite ends of one of the knuckles, in this instance, knuckle 2. Each of these bearing units comprises a pair of ball races 26, balls 27 therebetween, and a housing 28 of sheet metal spun about the races to secure them in assembled relation. The housings which are properly finished to give a neat and pleasing appearance to the butt, terminate short of the under surface of each lower race so that the lower races of units 15 and 25 rest upon knuckles 2 and 12 respectively. The bearing units 15 and 25 are secured in place by a tube 30 positioned within the knuckle 2 and having its ends spun out or flared as at 31, 32 to engage and interlock with the bearing units 15, 25, as clearly seen in Fig. 2.

By preference, the tube 30 is formed of sheet metal rolled over upon itself until its edges overlap as shown in full lines Fig. 3 reducing its diameter so that it may be readily inserted in the knuckle and bearing units and thereafter it is expanded by means of any suitable tool until it fits closely the knuckle and bearing units, when the ends of the tube are flared as indicated at 31, 32. The dotted lines of Fig. 3 show the shape of the tube when expanded.

The arrangement just described is of advantage in that it may be economically manufactured and easily assembled. A carpenter may take the leaves apart to attach the same to a casing and door without danger of misplacing or losing the parts of the bearings. The bearings will be effective to reduce friction irrespective of which leaf is attached to the door, as it will be readily seen that if the leaf *b* is attached to the door, the knuckle 11 is supported on the upper bearing unit 15, and if the leaf *a* is attached to the door, the knuckle 2 is supported by the lower unit 25. If, for any reason, it is desired to remove the attachment from the knuckle, this may be readily accomplished by merely cutting off one end of the tube 30.

Figure 4:
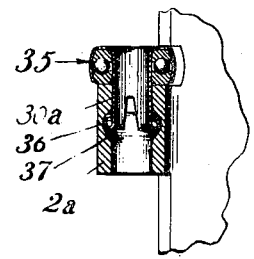
Fig. 4 is a view similar to Fig. 2 but illustrating another embodiment of the invention.

In that embodiment shown in Fig. 4, a bearing unit 35 is held in place on the knuckle 2ª by the tube 30ª having spring fingers 36 the ends of which are rolled to form beads which spring into a groove 37 in the knuckle. With this construction, the bearing unit 35 may be quickly attached to and removed from the knuckle. By preference, a bearing unit will be attached in a similar manner to one of the knuckles of the other leaf of the butt so that either leaf may be attached to the door as in the preceding embodiment.

While the forms of the device herein shown and described are admirably adapted to fulfil the objects of the invention, it is to be understood that it is not intended to confine the invention to the embodiments shown and described herein, as it is susceptible of embodiment in various forms all coming within the scope of the claims which follow.

I claim as my invention:

1. A butt hinge including a pair of leaves with interfitting knuckles having alined bores, a pintle in the bores, a bearing unit on one end of one of the knuckles comprising a pair of ball races, balls therebetween and a housing spun about the races and holding the same in assembled relation, and means for securing said bearing unit in place on said knuckle.

2. A butt hinge including a pair of leaves with inter-fitting knuckles having alined bores, a pintle in the bores, a bearing unit upon one end and externally of one of the knuckles and comprising a pair of ball races, balls therebetween and a housing spun about said races and holding the same in assembled relation, and a tubular member extending through and having one end expanded over said bearing unit the other end of said tubular member extending into the bore of said knuckle and being anchored.

3. A butt hinge including a pair of leaves with inter-fitting knuckles having alined bores, a pintle in the bores, a bearing unit on and externally of each end of one of the knuckles and each unit comprising a pair of ball races, balls therebetween and a housing about said races for securing the same in assembled relation, and a tubular member within the bore of said knuckle and having its ends expanded over both of said bearing units.

4. A butt hinge including a pair of leaves with inter-fitting knuckles having alined bores, a pintle in said bores, a ball bearing upon each end of one of the knuckles, and a split tubular member extending through and expanded into said knuckle and having its ends expanded into locking engagement with said bearing.

5. A butt hinge including a pair of leaves with inter-fitting knuckles having alined bores, a pintle in the bores, a ball bearing unit upon each end of one of the knuckles, and a tubular member extending through said knuckle and having its opposite ends expanded into locking engagement with said bearing, said tubular member being formed of sheet metal rolled upon itself with its edges overlapping and expanded in said knuckle substantially as described.

FRANK A. MYERS.